F. O. BOSWELL.
NON-SKID CHAIN FOR AUTOMOBILES.
APPLICATION FILED JUNE 13, 1919.
1,356,035.
Patented Oct. 19, 1920.
2 SHEETS—SHEET 1.
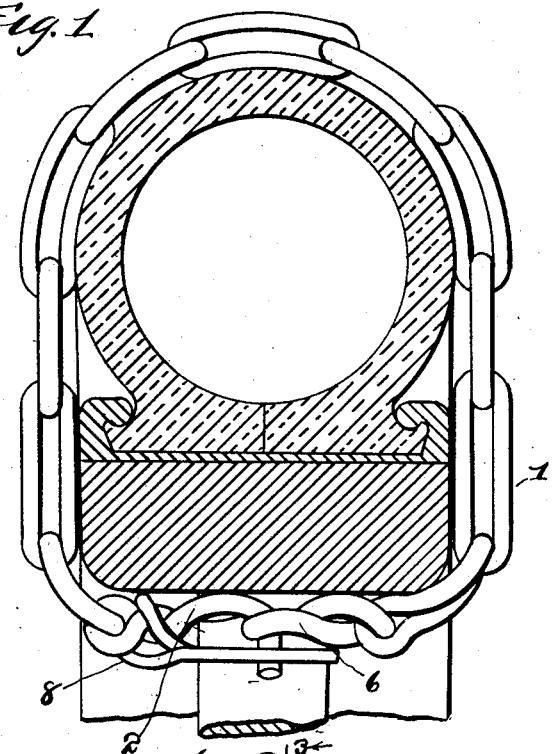
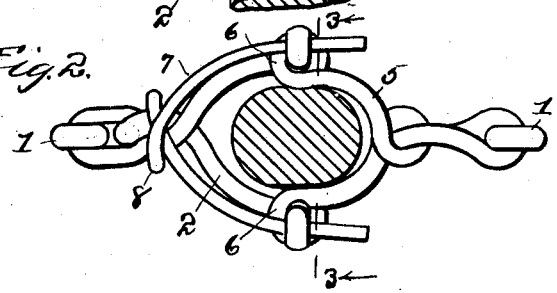
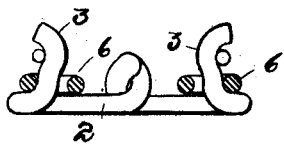
Inventor
Fletcher O. Boswell
By W. W. Williamson
Atty.

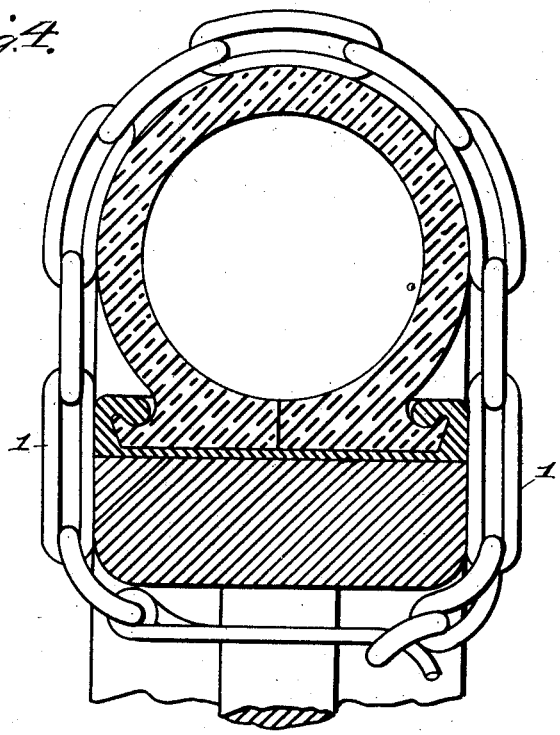
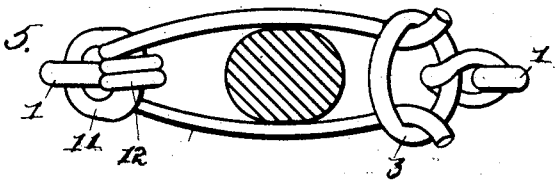

UNITED STATES PATENT OFFICE.

FLETCHER O. BOSWELL, OF PHILADELPHIA, PENNSYLVANIA, ASSIGNOR TO F. O. B. MANUFACTURING COMPANY, OF PHILADELPHIA, PENNSYLVANIA, A CORPORATION OF DELAWARE.

NON-SKID CHAIN FOR AUTOMOBILES.

1,356,035.      Specification of Letters Patent.      Patented Oct. 19, 1920.

Application filed June 13, 1919. Serial No. 303,906.

*To all whom it may concern:*

Be it known that I, FLETCHER O. BOSWELL, a citizen of the United States, residing at Philadelphia, in the county of Philadelphia and State of Pennsylvania, have invented new and useful Improvements in Non-Skid Chains for Automobiles, of which the following is a specification.

My invention relates to a new and useful improvement in non-skid chains for automobiles, and has for its object to provide individual sections of chain each adapted to pass around the tire and wheel rim and provided with means for attachment to the spokes of the wheel.

A further object of my invention is to provide a simple and effective locking device which will prevent the accidental detachment of the chains which will permit their ready removal when required.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawing forming a part of this application, in which:—

Figure 1, is a section of a portion of an automobile wheel showing my improved non-skid chain attached to one of the spokes.

Fig. 2, is a section of a spoke clearly showing the means for attaching the ends of the chain to said spoke.

Fig. 3, is a section at the line 3—3 of Fig. 2, looking in the direction of the arrow, the spoke being omitted.

Fig. 4, is a view similar to Fig. 1, showing a modified form of the locking mechanism.

Fig. 5, is a section of a spoke showing this modified locking mechanism attached to said spoke.

In carrying out my invention as embodied in Figs. 1 to 3 inclusive, 1 represents a short length of chain which may be composed of any desired form of links having attached to one end thereof the yoke member 2, the ends of which latter are up turned to form the posts 3. These posts 3 are so formed as to coact with the locking means for the purpose hereinafter set forth.

The opposite end of the chain has attached thereto the yoke member 5 the ends of which terminate in the eyes 6 adapted to pass over the posts 3 of the yoke member 2.

7 represents the locking member which is coupled to the yoke member as at 8 and this locking member is in the general form of a pair of tongs. This locking member is utilized for preventing the yoke members from being disengaged and accomplishes this purpose by being forced into engagement with the posts 3 in such manner as to cause each of the prongs thereof to enter into one of the curved sections of the posts as clearly shown in Fig. 3, and when so engaged will be retained in position by the spring action of the prongs of the locking member, there being sufficient spring in this member for that purpose.

To attach these non-skid chains to an automobile wheel it is only necessary to pass each chain around the tire, embrace the spoke with the yoke members, passing the eyes of one of these members over the posts of the other member and then snap the locking member over said posts, when the chain will be securely held in place. One of these chains may be attached to each spoke of the wheel or certain spokes may be skipped as desired, and when a wheel is thus equipped the chains act independent of each other and when one becomes worn it may be readily replaced by unsnapping the locking member and disengaging the yoke members making it possible to replace the worn or broken chain without the use of tools and in an exceedingly short time.

In Figs. 4 and 5 I have shown a slightly modified form of locking device which consists of a spring yoke 10 attached to one end of the chain 1 by a ring 11, a portion of said yoke being coiled around said ring as at 12, which coil increases the resiliency of the yoke. The opposite end of the chain also carries a ring 13 of sufficient size to receive the ends of the yoke, which ends are curved outward and upward so as to act as hooks for engagement with the ring 13.

On account of the convenience of attaching and removing non-skid chains made in accordance with my improvement the user of an automobile may remove the same should the occasion for their use cease and readily replace them when occasion requires.

Of course I do not wish to be limited to the exact details of construction as herein shown as these may be varied within the limits of the appended claims without departing from the spirit of my invention.

Having thus fully described my invention, what I claim as new and useful is:—

1. The herein described combination of a single length of chain, a yoke attached to each end of said chain, one of said yokes having posts and the other yoke having eyes for engagement with said posts, and a locking member for engaging said posts to prevent the disengagement of the yokes.

2. The herein described combination of a chain, a yoke attached to one end of said chain adapted to partially surround the spoke of an automobile wheel, curved posts formed with the yoke, a second yoke attached to the opposite end of said chain, eyes formed upon the ends of said second yoke adapted to engage with the said posts, a tong shaped locking member loosely attached to one end of the chain and having its ends curved for engagement with the curved posts.

In testimony whereof I have hereunto affixed my signature.

FLETCHER O. BOSWELL.